United States Patent
Hirade et al.

(10) Patent No.: US 9,969,894 B2
(45) Date of Patent: May 15, 2018

(54) ACTIVE-ENERGY-RAY-CURABLE COMPOSITION, ACTIVE-ENERGY-RAY-CURABLE INK, COMPOSITION STORED CONTAINER, METHOD AND APPARATUS FOR FORMING TWO-DIMENSIONAL OR THREE-DIMENSIONAL IMAGE, TWO-DIMENSIONAL OR THREE-DIMENSIONAL IMAGE, STRUCTURE, AND PROCESSED PRODUCT

(71) Applicants: Tomohiro Hirade, Kanagawa (JP); Tsuyoshi Asami, Kanagawa (JP)

(72) Inventors: Tomohiro Hirade, Kanagawa (JP); Tsuyoshi Asami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 8 days.

(21) Appl. No.: 15/042,928

(22) Filed: Feb. 12, 2016

(65) Prior Publication Data
US 2016/0257831 A1 Sep. 8, 2016

(30) Foreign Application Priority Data

Mar. 3, 2015 (JP) .................................. 2015-041123
Jan. 18, 2016 (JP) .................................. 2016-007366

(51) Int. Cl.
| | |
|---|---|
| *C09D 11/322* | (2014.01) |
| *C09D 11/101* | (2014.01) |
| *B29C 64/129* | (2017.01) |
| *B29K 105/00* | (2006.01) |
| *B33Y 10/00* | (2015.01) |
| *B33Y 30/00* | (2015.01) |
| *B33Y 70/00* | (2015.01) |

(52) U.S. Cl.
CPC .......... *C09D 11/322* (2013.01); *B29C 64/129* (2017.08); *C09D 11/101* (2013.01); *B29K 2105/0032* (2013.01); *B33Y 10/00* (2014.12); *B33Y 30/00* (2014.12); *B33Y 70/00* (2014.12)

(58) Field of Classification Search
CPC ..... C09D 11/101; C09D 11/322; C09D 11/38; C09D 11/328; C09D 11/326
See application file for complete search history.

(56) References Cited

U.S. PATENT DOCUMENTS

| | | | |
|---|---|---|---|
| 7,803,851 B2* | 9/2010 | Ishibashi .............. | C09D 11/101 522/168 |
| 8,366,818 B2* | 2/2013 | Umebayashi ........ | C09D 11/101 106/31.13 |
| 9,016,846 B2* | 4/2015 | Ikeda ................... | C09D 11/101 347/100 |
| 9,598,591 B2* | 3/2017 | Mizutani .............. | C09D 11/101 |
| 2011/0092610 A1 | 4/2011 | Habashi et al. | |
| 2014/0275319 A1* | 9/2014 | Yamada ............... | C09D 11/101 522/99 |

FOREIGN PATENT DOCUMENTS

| | | |
|---|---|---|
| JP | 2008-291266 | 12/2008 |
| JP | 2009-057546 | 3/2009 |
| JP | 2010-013506 | 1/2010 |

* cited by examiner

*Primary Examiner* — Sanza Mcclendon
(74) *Attorney, Agent, or Firm* — Oblon, McClelland, Maier & Neustadt, L.L.P.

(57) ABSTRACT

An active-energy-ray-curable composition including: a cyan pigment; and a polymerizable compound, wherein a ratio of absorbance at a wavelength of 385 nm to absorbance at a wavelength of 620 nm is 0.65 or less.

19 Claims, 3 Drawing Sheets

ACTIVE-ENERGY-RAY-CURABLE COMPOSITION, ACTIVE-ENERGY-RAY-CURABLE INK, COMPOSITION STORED CONTAINER, METHOD AND APPARATUS FOR FORMING TWO-DIMENSIONAL OR THREE-DIMENSIONAL IMAGE, TWO-DIMENSIONAL OR THREE-DIMENSIONAL IMAGE, STRUCTURE, AND PROCESSED PRODUCT

CROSS-REFERENCE TO RELATED APPLICATIONS

The present application claims priority under 35 U.S.C. § 119 to Japanese Patent Application No. 2015-041123, filed Mar. 3, 2015 and Japanese Patent Application No. 2016-007366, filed Jan. 18, 2016. The contents of which are incorporated herein by reference in their entirety.

BACKGROUND OF THE INVENTION

Field of the Invention

The present disclosure relates to active-energy-ray-curable compositions, active-energy-ray-curable inks, composition stored containers, methods and apparatuses for forming two-dimensional or three-dimensional images, two-dimensional or three-dimensional images, structures, and processed products.

Description of the Related Art

Active-energy-ray-curable ink jet recording methods require no solvent. Therefore, it is advantageous in that the active-energy-ray-curable ink jet recording methods do not generate volatile organic compounds (may be referred to as "VOC") harmful to the environment, that an ink used for the method has rapid drying ability, and that the method can be used for recording even on recording media that do not absorb liquid such as ink.

The active-energy-ray-curable compositions can be cured by ultraviolet rays. However, ultraviolet-rays emitting diode (hereinafter, may be referred to as "UV-LED") lamps emitting light having low energy (long wavelength) have been employed as light sources that cure the active-energy-ray-curable compositions, and thus there is a need for an active-energy-ray-curable composition cured with the UV-LED lamps and excellent in curing ability.

However, the pigments themselves have absorption in the ultraviolet region, and thus it is difficult to prevent the pigments from inhibiting absorption of the ultraviolet rays by polymerization inhibitors.

Therefore, in order to improve curing ability of inks, proposed is the active-energy-ray-curable ink having an absorbance ratio [(absorbance at a wavelength of 365 nm)/(absorbance at a wavelength of 430 nm)] of 0.50 or less during melting a yellow pigment constituting a yellow ink (see Japanese Unexamined Patent Application Publication No. 2009-57546).

SUMMARY OF THE INVENTION

An object of the present disclosure is to provide an active-energy-ray-curable composition that has good ejecting ability and good dispersibility, and that is excellent in curing ability and colorability.

As means for solving the above problems, an active-energy-ray-curable composition of the present disclosure contains a cyan pigment and a polymerizable compound, wherein a ratio of absorbance at a wavelength of 385 nm to absorbance at a wavelength of 620 nm is 0.65 or less.

According to the present disclosure, the active-energy-ray-curable composition that has good ejecting ability and good dispersibility, and that is excellent in curing ability and colorability can be provided.

Figure 1:
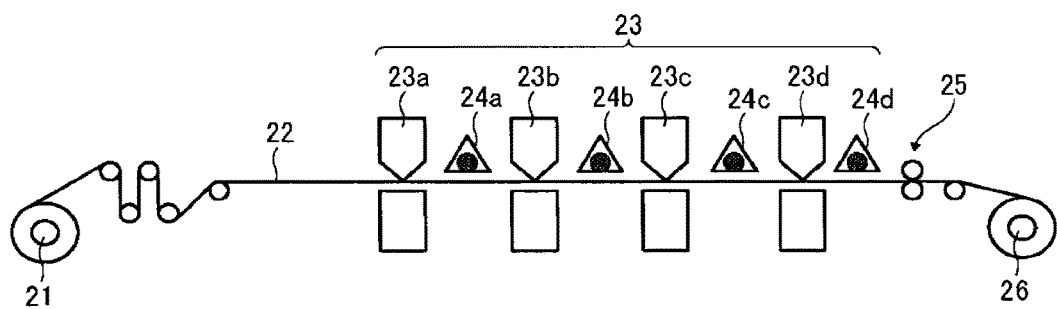
FIG. 1 is a schematic view of an example of an image forming apparatus of the present disclosure.

DETAILED DESCRIPTION OF THE INVENTION (Active-Energy-Ray-Curable Composition)

An active-energy-ray-curable composition of the present disclosure contains a cyan pigment and a polymerizable compound, wherein a ratio of absorbance at a wavelength of 385 nm to absorbance at a wavelength of 620 nm is 0.65 or less, and further contains a dispersant polymer, a polymerization initiator, a polymerization accelerator, and other components if necessary.

The present disclosure is based on the findings that absorbance of the existing active-energy-ray-curable inks depends on dispersibility, poor dispersibility results in low absorbance to lower coloring ability, and thus excellent coloring density of the pigment cannot be obtained.

In the active-energy-ray-curable composition of the present disclosure, it is preferable that a ratio of absorbance at a wavelength of 385 nm to absorbance at a wavelength of 620 nm be 0.65 or less, preferably 0.57 or less, more preferably 0.40 or less. When the ratio is 0.65 or less, the resultant ink can be improved in curing ability and colorability. That is, it is preferable that absorbance at an ultraviolet region of 385 nm be low, and that absorbance at a wavelength of about 620 nm, which is responsible for a concentration of the cyan, be large. A wavelength of 385 nm is a peak wavelength of an UV-LED light source. Therefore, when absorbance at a wavelength of 385 nm is relatively small, absorption inhibition of the active energy rays caused by the cyan pigment can be reduced. Thus, even if the active-energy-ray-curable composition is irradiated with ultraviolet light having a low intensity, the resultant ink will be excellent in curing ability, which can contribute to reduction in the environment load. Moreover, high absorbance at a wavelength of about 620 nm results in improvement in coloring ability.

A coloring density of a cured material having an average thickness of 10 μm is preferably 2.00 or more, more preferably 2.20 or more, where the cured material is obtained through curing by irradiating the active-energy-ray-curable composition with active energy rays having an illuminance of 1 W/cm$^2$ and an irradiation dose of 500 mJ/cm$^2$ on a base. Here, the average thickness can be measured by a contact (pointer) or eddy current film thickness meter such as an electronic micrometer (e.g., product of ANRITSU CORPORATION) and can be determined by an average value obtained from film thicknesses measured at ten points.

Absorbance at a wavelength of 385 nm is preferably 0.75 or less, more preferably 0.65 or less, when a concentration of the cyan pigment in the active-energy-ray-curable composition is 0.0020% by mass (20 ppm).

Absorbance at a wavelength of 620 nm is preferably 1.05 or more, when a concentration of the cyan pigment in the active-energy-ray-curable composition is 0.0020% by mass.

Even if absorbance of the cyan pigment alone satisfies the preferable range at the aforementioned wavelength, the absorbance greatly depends on a dispersing state even in the same pigment. Therefore, absorbance measured in a state where the cyan pigment is dispersed is preferably used. Specifically, good dispersibility results in large surface area of the pigment particles, and thus absorbance at a wavelength of about 620 nm, which is responsible for a concentration of the cyan pigment, increases. The active-energy-ray-curable composition can be calculated for the change of viscosity ($\Delta V$) obtained based on the following Formula (2) and can be measured for the 50% cumulative volume particle diameter ($D_{50}$), to judge whether the cyan pigment is excellent in the dispersibility.

The absorbance at a wavelength of 385 nm and the absorbance at a wavelength of 620 nm of the active-energy-ray-curable composition can be measured when a concentration of the cyan pigment in the active-energy-ray-curable composition is 0.0020% by mass.

The absorbance can be determined by measuring an active-energy-ray-curable composition precisely having a concentration of the cyan pigment of 0.0020% by mass using a spectrophotometer (device name: U-3900H, product of Hitachi High-Technologies Corporation), where the active-energy-ray-curable composition having a concentration of the cyan pigment of 0.0020% by mass can be obtained by diluting the active-energy-ray-curable composition that has been measured for a concentration of the cyan pigment by a simultaneous thermal analyzer (device name: TG/DTA7200, product of Seiko Instruments Inc.).

A concentration of the diluted cyan pigment measured by the simultaneous thermal analyzer (device name: TG/DTA7200, product of Seiko Instruments Inc.) can be measured according to JIS K 0129, but can be measured as described below, for example.

A standard material ($Al_2O_3$) and the active-energy-ray-curable composition are set in a sample holder, followed by heating from 25° C. to 500° C. in a nitrogen atmosphere at a heating rate of 10° C./min. Then, the atmosphere is purged with oxygen, followed by heating to 700° C. in an oxygen atmosphere at a heating rate of 10° C./min.

It can be confirmed that a weight of the sample is reduced due to the thermal decomposition of water in active-energy-ray-curable composition, and then is reduced due to thermal decomposition of the resin at about 300° C. as measured by thermogravimetry (TG).

It can be confirmed that a weight of the components (e.g., water, surfactant, dispersant polymer, polymerization initiator, and polymerization inhibitor) except for the pigment in the active-energy-ray-curable composition is reduced until the heating temperature rises to 500° C. as measured by thermogravimetry (TG).

It is confirmed that, during heating from 500° C. through 600° C., the pigment is decomposed, a large peak appears, and a weight of the pigment is reduced as measured by thermogravimetry (TG).

The amount of the reduced weight as measured by thermogravimetry (TG) at from 500° C. through 600° C. can be used to determine the quantity of the cyan pigment in the active-energy-ray-curable composition.

Based on the concentration of the cyan pigment in the active-energy-ray-curable composition as measured above, it can be adjusted to 0.0020% by mass through dilution for the measurement.

<Viscosity>

The viscosity of the active-energy-ray-curable composition of the present disclosure has no particular limit because it can be adjusted depending on the purpose and application devices. For example, if an ejecting device that ejects the composition from nozzles is employed, the viscosity thereof is preferably in the range of 3 mPa·s to 40 mPa·s, more preferably 5 mPa·s to 15 mPa·s, and particularly preferably 6 mPa·s to 12 mPa·s in the temperature range of 20 degrees C. to 65 degrees C., preferably at 25 degrees C. In addition, it is particularly preferable to satisfy this viscosity range by the composition free of the organic solvent described above. Incidentally, the viscosity can be measured by a cone plate rotary viscometer (VISCOMETER TVE-22L, manufactured by TOKI SANGYO CO., LTD.) using a cone rotor (1°34'× R24) at a number of rotation of 50 rpm with a setting of the temperature of hemathermal circulating water in the range of 20 degrees C. to 65 degrees C. VISCOMATE VM-150III can be used for the temperature adjustment of the circulating water.

A change of viscosity ($\Delta V$) of the active-energy-ray-curable composition is preferably 15% or less, more preferably 10% or less, particularly preferably 5% or less. When the change of viscosity ($\Delta V$) is 15% or less, the resultant ink can be excellent in storage stability and can be improved in dispersibility. The change of viscosity ($\Delta V$) can be determined based on the following Formula (2), $$\text{Change of viscosity } (\Delta V)(\%)=|V-V_0|/V_0 \times 100 \quad \text{Formula (2)},$$

where in the Formula (2), $V_0$ is an initial viscosity at 25° C., and V is a viscosity at 25° C. after storage at 70° C. for 14 days.

A 50% cumulative volume particle diameter ($D_{50}$) of the active-energy-ray-curable composition is preferably 100 nm or more but 160 nm or less. The 50% cumulative volume particle diameter ($D_{50}$) is 100 nm or more, sufficient weatherability of the ink can be obtained. Moreover, pigment particles can be prevented from raising cohesive energy caused by too small particles, which can improve the ink in dispersibility and ejection stability. When the 50% cumulative volume particle diameter ($D_{50}$) is 160 nm or less, absorption at about 620 nm, which is responsible for a concentration of cyan can increase, and the resultant ink can be improved in ejecting ability. Here, a particle size analyzer (product name: UPA150, product of NIKKISO CO., LTD.) can be used to measure the 50% cumulative volume particle diameter ($D_{50}$) by 500-fold diluting the active-energy-ray-curable composition in the polymerizable monomer serving as the dispersion medium. Note that, the 50% cumulative volume particle diameter ($D_{50}$) of the active-energy-ray-curable composition means a 50% cumulative volume particle diameter ($D_{50}$) obtained by subjecting the active-energy-ray-curable composition itself to the measurement, and corresponds to a 50% cumulative volume particle diameter ($D_{50}$) of particulate matters (specifically, pigment dispersion liquid containing the cyan pigment) in the active-energy-ray-curable composition.

A distribution width of particle size distribution of the active-energy-ray-curable composition is preferably 60 nm or less. The distribution width of particle size distribution is 60 nm or less, absorption at about 620 nm, which is responsible for a concentration of cyan can increase, and thus the resultant ink can be improved in ejecting ability. Note that, the distribution width of particle size distribution can be determined based on the following Formula (1).

A particle size analyzer (device name: UPA150, product of NIKKISO CO., LTD.) can be used to measure the 84% cumulative volume particle diameter ($D_{84}$) and the 16% cumulative volume particle diameter ($D_{16}$).

Distribution width of particle size distribution=(84% cumulative volume particle diameter−16% cumulative volume particle diameter)/2   Formula (1)

Dispersibility of the cyan pigment depends on a pigment, a dispersion medium, a dispersant polymer, and dispersing conditions.

<Cyan Pigment>

The cyan pigment is not particularly limited and may be appropriately selected depending on the intended purpose.

A number average primary particle diameter of the cyan pigment is preferably 30 nm or more but 120 nm or less. When the number average primary particle diameter of the cyan pigment is 30 nm or more but 120 nm or less, the cyan pigment can be improved in dispersibility. Note that, the number average primary particle diameter can be determined by a scanning electron microscope (device name: SU3500, product of Hitachi High-Technologies Corporation) as described below: an unidirectional particle diameter of the primary particles (200 particles or more but 500 particles or less) is measured at ×10,000 magnification, and the obtained unidirectional particle diameters are used to calculate an average value of the primary particle diameter in cumulative distribution, where each of the primary particles is sandwiched by two parallel lines.

The cyan pigment is not particularly limited and may be appropriately selected depending on the intended purpose. Examples of the cyan pigment include phthalocyanine pigments such as C.I. pigment blue 15:3 and C.I. pigment blue 15:4. Among them, C.I. pigment blue 15:4 is preferable in terms of color property, dispersibility, and weatherability. In order to obtain good dispersibility, the surface of the cyan pigment is preferably treated with an acid. The cyan pigment treated with an acid more easily adsorbs an acid dispersant polymer, which can result in improvement of dispersibility due to steric repulsion.

A method for treating the surface of the cyan pigment with an acid is not particularly limited and may be appropriately selected depending on the intended purpose. Examples of the method include various methods such as a pigment-derivative treatment, a resin modification, oxidation treatment, and plasma treatment.

As the cyan pigment, a commercially available product can be used. Examples of the commercially available product include LX-8091 (C.I. pigment blue 15:4, product of TOYOCOLOR CO., LTD), B4G (C.I. pigment blue 15:4, product of Clariant (Japan) K.K.), and D7110F (C.I. pigment blue 15:4, product of BASF).

An amount of the cyan pigment is preferably 1% by mass or more but 5% by mass or less relative to the total amount of the active-energy-ray-curable composition. When the amount of the cyan pigment is 1% by mass or more, the resultant ink can be improved in colorability. When the amount of the cyan pigment is 5% by mass or more, the resultant ink can be prevented from raising viscosity, and can be improved in ejecting ability.

<<Other Colorants>>

As the other colorants, other pigments and dyes that impart various gloss colors (e.g., black, white, cyan, magenta, green, orange, gold, and silver) to the composition can be used depending on the purpose and the demanded property of the active-energy-ray-curable composition in the present disclosure. An amount of the other colorants is preferably 0.1% by mass or more but 20% by mass or less, more preferably 1% by mass or more but 10% by mass or less, relative to the total amount of the active-energy-ray-curable composition.

Examples of the other pigments include an inorganic pigment and an organic pigment. These may be used alone or in combination thereof.

Examples of the inorganic pigment include carbon blacks (C.I. Pigment Black 7) such as Furnace black, Lamp black, acetylene black, and Channel black; iron oxide; and titanium oxide.

Examples of the organic pigment include azo pigments (e.g., an insoluble azo pigment, a condensated azo pigment, azo lake, and a chelate azo pigment), polycyclic pigments (e.g., a perylene pigment, a perinone pigment, an anthraquinone pigment, a dioxane pigment, a thioindigo pigment, a quinacridone pigment, an isoindolinone pigment, and a quinophthalone pigment), dye chelates (e.g., a basic dye chelate and an acid dye chelate), dye lakes (e.g., a basic dye lake and an acid dye lake), a nitro pigment, a nitroso pigment, aniline black, and a daylight fluorescent pigment.

The dye is not particularly limited and may be appropriately selected depending on the intended purpose. Examples of dye include an acid dye, a direct dye, a reactive dye, and a basic dye. These may be used alone or in combination thereof.

<Polymerizable Compound>

The polymerizable compound is not particularly limited and may be appropriately selected depending on the intended purpose, so long as it can polymerize by active energy rays (e.g., ultraviolet rays and electron beam). These may be used alone or in combination thereof in order to adjust reaction speed, ink properties, and properties of the cured film.

Examples of the polymerizable compound include a radical-polymerizable compound.

Examples of the radical-polymerizable compound include a (meth)acrylate compound, a (meth)acrylamide compound, and an aromatic vinyl compound. These may be used alone or in combination thereof. Note that, in the present specification, (meth)acrylate means at least one of acrylate and methacrylate, and (meth)acryl means at least one of acryl and methacryl.

<<(Meth)Acrylate Compound>>

Examples of the (meth)acrylate compound include a monofunctional (meth)acrylate, a bifunctional (meth)acrylate, a trifunctional (meth)acrylate, a tetrafunctional (meth)acrylate, a pentafunctional (meth)acrylate, and a hexafunctional (meth)acrylate. These may be used alone or in combination thereof.

Examples of the monofunctional (meth)acrylate include hexyl (meth)acrylate, 2-ethylhexyl (meth)acrylate, tert-octyl (meth)acrylate, isoamyl (meth)acrylate, decyl (meth)acrylate, isodecyl (meth)acrylate, stearyl (meth)acrylate, isostearyl (meth)acrylate, cyclohexyl (meth)acrylate, 4-n-butylcyclohexyl (meth)acrylate, bornyl (meth)acrylate, isobornyl (meth)acrylate, benzyl (meth)acrylate, butoxyethyl (meth) acrylate, 2-chloroethyl (meth)acrylate, 4-bromobutyl (meth) acrylate, cyanoethyl (meth)acrylate, benzyl (meth)acrylate, butoxymethyl (meth)acrylate, 3-methoxybutyl (meth)acrylate, alkoxymethyl (meth)acrylate, alkoxyethyl (meth)acrylate, 2-(2-methoxyethoxy)ethyl (meth)acrylate, 2-(2-butoxyethoxy)ethyl (meth)acrylate, 2,2,2-tetrafluoroethyl (meth)acrylate, 1H,1H,2H,2H-perfluoro decyl (meth)acrylate, 4-butylphenyl (meth)acrylate, phenyl (meth)acrylate, 2,4,5-tetramethylphenyl (meth)acrylate, 4-chlorophenyl (meth)acrylate, phenoxymethyl (meth)acrylate, phenoxyethyl (meth)acrylate, glycidyl (meth)acrylate, glycidyloxy butyl (meth)acrylate, glycidyloxy ethyl (meth)acrylate, glycidyloxy propyl (meth)acrylate, tetrahydrofurfuryl (meth)acrylate, hydroxyalkyl (meth)acrylate, 2-hydroxyethyl (meth)acrylate, 3-hydroxypropyl (meth)acrylate, 2-hydroxypropyl (meth)acrylate, 2-hydroxybutyl (meth)acrylate, 4-hydroxybutyl (meth)acrylate, dimethylaminoethyl (meth)acrylate, diethylaminoethyl (meth)acrylate, dimethylaminopropyl (meth)acrylate, diethylaminopropyl (meth)acrylate, trimethoxysilylpropyl (meth)acrylate, trimethylsilylpropyl (meth)acrylate, polyethylene oxide monomethyl ether (meth)acrylate, origoethylene oxide monomethyl ether (meth)acrylate, polyethylene oxide (meth)acrylate, origoethylene oxide (meth)acrylate, origoethylene oxide monoalkyl ether (meth)acrylate, polyethylene oxide monoalkyl ether (meth)acrylate, dipropylene glycol (meth)acrylate, polypropylene oxide monoalkyl ether (meth)acrylate, oligopropylene oxide monoalkyl ether (meth)acrylate, 2-methacryloyloxyethyl succinic acid, 2-methacryloyloxyhexahydro phthalic acid, 2-methacryloyloxyethyl-2-hydroxypropyl phthalate, butoxydiethylene glycol (meth)acrylate, trifluoroethyl (meth)acrylate, perfluorooctyethyl (meth)acrylate, 2-hydroxy-3-phenoxypropyl (meth)acrylate, ethylene oxide-modified phenol (meth)acrylate, ethylene oxide-modified cresol (meth)acrylate, ethylene oxide-modified nonylphenol (meth)acrylate, propylene oxide-modified nonylphenol (meth)acrylate, ethylene oxide-modified-2-ethylhexyl (meth)acrylate, acrylic acid-2-(2-vinyloxyethoxy) ethyl, and benzyl acrylate. These may be used alone or in combination thereof. Among them, phenoxyethyl (meth)acrylate, benzyl acrylate, acrylic acid-2-(2-vinyloxyethoxy) ethyl, 2-hydroxyethyl (meth)acrylate, 3-hydroxypropyl (meth)acrylate, 2-hydroxypropyl (meth)acrylate, and 4-hydroxybutyl (meth)acrylate are preferable in terms of low viscosity, low odor, and high curing ability; and phenoxyethyl (meth)acrylate and benzyl acrylate are particularly preferable because these compounds have a good compatibility with polymerization initiators and another monomers.

Examples of the bifunctional (meth)acrylate include 1,6-hexanediol di(meth)acrylate, 1,10-decanediol di(meth)acrylate, neopentyl glycol di(meth)acrylate, 2,4-dimethyl-1,5-pentanediol di(meth)acrylate, butyl ethyl propanediol di(meth)acrylate, ethoxylated cyclohexanemethanol di(meth)acrylate, polyethylene glycol di(meth)acrylate, oligoethylene glycol di(meth)acrylate, ethylene glycol di(meth)acrylate, 2-ethyl-2-butyl-butanediol di(meth)acrylate, hydroxypivalic acid neopentylglycol di(meth)acrylate, ethylene oxide-modified bisphenol A di(meth)acrylate, bisphenol F polyethoxy di(meth)acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonane di(meth)acrylate, propoxylated ethoxylated bisphenol A di(meth)acrylate, tricyclodecane di(meth)acrylate, and 1,9-nonanediol diacrylate. These may be used alone or in combination thereof.

Examples of the trifunctional (meth)acrylate include trimethylolpropane tri(meth)acrylate, trimethylolethane tri (meth)acrylate, alkylene oxide-modified tri(meth)acrylate of trimethylolpropane, pentaerythritol tri(meth)acrylate, dipentaerythritol tri(meth)acrylate, trimethylolpropane tri((meth) acryloyloxy propyl)ether, isocyanuric acid alkylene oxide-modified tri(meth)acrylate, propionic acid dipentaerythritol tri(meth)acrylate, tri((meth)acryloyloxy ethyl) isocyanurate, hydroxy pivalic aldehyde-modified dimethylolpropane tri (meth)acrylate, sorbitol tri(meth)acrylate, propoxylated trimethylolpropane tri(meth)acrylate, and ethoxylated glycerin tri(meth)acrylate. These may be used alone or in combination thereof.

Examples of the tetrafunctional (meth)acrylate include pentaerythritol tetra(meth)acrylate, sorbitol tetra(meth)acrylate, ditrimethylolpropane tetra(meth)acrylate, propionic acid dipentaerythritol tetra(meth)acrylate, and ethoxylated pentaerythritol tetra(meth)acrylate. These may be used alone or in combination thereof.

Examples of the pentafunctional (meth)acrylate include sorbitol penta (meth)acrylate and dipentaerythritol penta (meth)acrylate. These may be used alone or in combination thereof.

Examples of the hexafunctional (meth)acrylate include dipentaerythritol hexa(meth)acrylate, sorbitol hexa(meth) acrylate, alkylene oxide-modified hexa(meth)acrylate of phosphazene, and caprolactone-modified dipentaerythritol hexa(meth)acrylate. These may be used alone or in combination thereof.

<<(Meth)Acrylamide Compound>>

Examples of the (meth)acrylamide compound include (meth)acrylamide, N-methyl (meth)acrylamide, N-ethyl (meth)acrylamide, N-propyl (meth)acrylamide, N-n-butyl (meth)acrylamide, N-t-butyl (meth)acrylamide, N-butoxymethyl (meth)acrylamide, N-isopropyl (meth)acrylamide, N-methylol (meth)acrylamide, N,N-dimethyl (meth)acrylamide, N,N-diethyl (meth)acrylamide, (meth)acryloyl morpholine, and hydroxyethyl (meth)acrylamide. These may be used alone or in combination thereof. Among them, (meth) acryloyl morpholine is preferable.

<<Aromatic Vinyl Compound>>

Examples of the aromatic vinyl compound include styrene, methylstyrene, dimethylstyrene, trimethylstyrene, ethylstyrene, isopropylstyrene, chloromethylstyrene, methoxystyrene, acetoxy styrene, chlorostyrene, dichlorostyrene, bromostyrene, vinyl benzoic acid methylester, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allystyrene, isopropenyl styrene, butenylstyrene, octenylstyrene, 4-t-butoxycarbonyl styrene, 4-methoxystyrene, and 4-t-butoxystyrene. These may be used alone or in combination thereof.

As a dispersion medium used for dispersing the cyan pigment, a monofunctional polymerizable compound is preferably used in terms of dispersibility and low viscosity. Improvement of dispersibility makes particle diameter distribution uniform. Moreover, reduction in excessively small particles and aggregated particles can prevent inhibition of absorption of ultraviolet light, and can improve curing ability and ejecting ability.

Examples of the monofunctional polymerizable compound used for the dispersion medium include phenoxyethyl acrylate, acryloyl morpholine, and benzyl acrylate.

As the monofunctional polymerizable compound used for the dispersion medium, a commercially available product can be used. Examples of the commercially available product include product name: VISCOAT #192 (compound: phenoxyethyl acrylate, product of Osaka Organic Chemical Industry Ltd., structural formula: the following formula (M-1)), product name: ACMO (compound: acryloyl morpholine, product of KOHJIN Film & Chemicals Co., Ltd., structural formula: the following formula (M-2)), and product name: VISCOAT #160 (compound: benzyl acrylate, product of Osaka Organic Chemical Industry Ltd., structural formula: the following formula (M-3)) because dispersion liquid excellent in dispersion stability can be obtained. These may be used alone or in combination thereof.

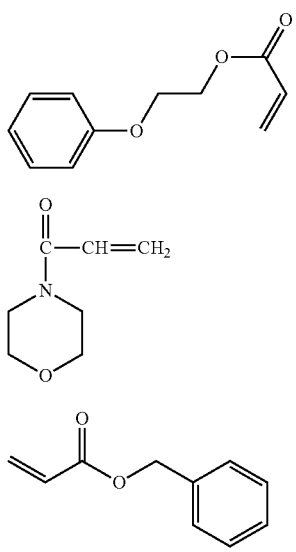

Formula (M-1)

Formula (M-2)

Formula (M-3)

An amount of the polymerizable compound is preferably 50% by mass or more but 95% by mass or less, more preferably 60% by mass or more but 92% by mass or less, particularly preferably 70% by mass or more but 90% by mass or less, relative to the total amount of the active-energy-ray-curable composition.

<Dispersant Polymer>

The dispersant polymer is not particularly limited and may be appropriately selected depending on the intended purpose.

Examples of the dispersant polymer include a hydroxyl group-containing carboxylic acid ester, a salt of long chain polyaminoamide and acid ester having high molecular weight, a salt of polycarboxylic acid having high molecular weight, a salt of long chain polyaminoamide and a polar acid ester, an unsaturated acid ester having high molecular weight, a modified polyurethane, a modified polyacrylate, a polyether ester anionic surfactant, a salt of naphthalene sulfonic acid formalin condensate, polyoxyethylene alkyl phosphoric acid ester, polyoxyethylene nonyl phenyl ether, polyester polyamine, and stearylamine acetate. These may be used alone or in combination thereof. Among them, the dispersant polymer having a basic, polar functional group is preferable. The dispersant polymer has a basic, polar functional group, and thus the surface of the cyan pigment can adsorb the dispersant polymer, which results in improvement of dispersion stability. Use of the dispersant polymer can improve steric effects of the cyan pigment due to adsorption of dispersant, which results in high dispersion stability. Note that, the dispersant polymer is a dispersant polymer having a weight average molecular weight of 1,000 or more.

Examples of the basic, polar functional group include an amino group, an imino group, an amide group, an imide group, and a nitrogen-containing heterocyclic group. Among them, an amino group is preferable in terms of adsorption ability, dispersibility in the polymerizable compound, and ability to lower viscosity.

The amine value of the dispersant polymer is preferably 10 mg KOH/g or more but 30 mg KOH/g or less, more preferably 15 mg KOH/g or more but 30 mg KOH/g. It is believed that the dispersant having an amine value of 10 mg KOH/g or more but 30 mg KOH/g or less can avoid proceeding with polymerization with the polymerizable compound that is a component in the composition even during storage for a long term or heating, and it is presumed that the dispersant having an amine value of the aforementioned range can lower change of viscosity during storage for a long term and heating, which results in the ink having high storage stability. Note that, the amine value can be calculated based on a potential difference, where the potential difference can be obtained as described below: the dispersant polymer (1 g) is dissolved in methyl isobutyl ketone (100 mL), and then a 0.01 mol/L chloric acid methyl isobutyl ketone solution is used to perform potentiometric titration using an automatic titrator (device name: GT-200, product of Mitsubishi Chemical Analytech, Co., Ltd.) to measure a potential difference.

As the dispersant polymer, a commercially available product can be used. Examples of the commercially available product include SOLSPERSE series (product of The Lubrizol Corporation) such as product name: SOLSPERSE 24000 (amine value: 41.6 mg KOH/g), product name: SOLSPERSE 32000 (amine value: 31.2 mg KOH/g), product name: SOLSPERSE 39000 (amine value: 25.7 mg KOH/g), product name: SOLSPERSE J100, and product name: SOLSPERSE J200; Disper BYK series (product of BYK Japan KK) such as product name: Disper BYK-162 (amine value: 13 mg KOH/g), product name: Disper BYK-163 (amine value: 10 mg KOH/g), product name: DISPERBYK-168 (amine value: 11 mg KOH/g), product name: DISPERBYK-2050 (amine value: 30.7 mg KOH/g), product name: DISPERBYK-2200 (30.7 mg KOH/g), and product name: DISPERBYK-2150 (amine value: 56.7 mg KOH/g); BYKJET series (product of BYK Japan KK) such as product name: BYKJET-9151 (amine value: 17.2 mg KOH/g), and product name: BYKJET-9152 (amine value: 27.3 mg KOH/g); and AJISPER series (product of Ajinomoto Fine-Techno Co., Inc.) such as product name: AJISPER PB821 (amine value: 11.2 mg KOH/g), product name: AJISPER PB-822 (amine value: 18.2 mg KOH/g), and product name: AJISPER PB-881 (amine value: 17.4 mg KOH/g).

An amount of the dispersant polymer is preferably 10% by mass or more but 50% by mass or less, more preferably 15% by mass or more but 40% by mass or less, relative to the total amount of the cyan pigment. When the amount of the dispersant polymer is 10% by mass or more, dispersibility of the dispersant polymer can be improved. When the amount of the dispersant polymer is 50% by mass or less, it is presumed that an amount of the free dispersant polymer that is not adsorb to the cyan pigment is low, which does not increase much the viscosity of the resultant ink.

<Polymerization Initiator>

The active-energy-ray-curable composition of the present disclosure optionally contains a polymerization initiator. The polymerization initiator produces active species such as a radical or a cation upon application of energy of an active energy ray and initiates polymerization of a polymerizable compound (monomer or oligomer). As the polymerization initiator, it is suitable to use a known radical polymerization initiator, cation polymerization initiator, base producing agent, or a combination thereof. Of these, a radical polymerization initiator is preferable. Moreover, the polymerization initiator preferably accounts for 5 percent by weight to 20 percent by weight of the total content of the composition (100 percent by weight) to obtain sufficient curing speed.

Specific examples of the radical polymerization initiators include, but are not limited to, aromatic ketones, acylphosphine oxide compounds, aromatic onium chlorides, organic peroxides, thio compounds (thioxanthone compounds, thiophenyl group containing compounds, etc.), hexaaryl biimidazole compounds, ketoxime ester compounds, borate compounds, azinium compounds, metallocene compounds, active ester compounds, compounds having a carbon halogen bond(s), and alkyl amine compounds.

In addition, a polymerization accelerator (sensitizer) is optionally used together with the polymerization initiator. The polymerization accelerator is not particularly limited. Preferred examples thereof include, but are not limited to, amines such as trimethylamine, methyl dimethanol amine, triethanol amine, p-diethylamino acetophenone, p-dimethyl amino ethylbenzoate, p-dimethyl amino benzoate-2-ethyl-hexyl, N,N-dimthyl benzylamine and 4,4'-bis(diethylamino) benzophenone. The content thereof is determined depending on the identity (type) of the polymerization initiator and the content thereof.

<Other Components>

The active-energy-ray-curable composition of the present disclosure optionally contains other known components.
The other known components are not particularly limited. Specific examples thereof include, but are not limited to, known articles such as surfactants, polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, (regulators), and thickeners.

<<Polymerization Inhibitor>>

Examples of the polymerization inhibitor include 4-methoxy-1-naphthol, methyl hydroquinone, hydroquinone, t-butylhydroquinone, di-t-butylhydroquinone, hydroquinone monomethylether, 2,2'-dihydroxy-3,3'-di($\alpha$-methyl cyclohexyl)-5,5'-dimethyldiphenylmethane, p-benzoquinone, di-t-butyl diphenylamine, 9,10-di-n-butoxy anthracene, and 4,4'-[1,10-dioxo-1,10-decanediylbis(oxy)]bis[2,2,6,6-tetramethyl]-1-piperidinyloxy. These may be used alone or in combination thereof.

An amount of the polymerization inhibitor is preferably 0.005% by mass or more but 3% by mass or less relative to the total amount of polymerization initiator. When the amount of the polymerization inhibitor is 0.005% by mass or more, the resultant ink can be improved in storage stability, and can be prevented from raising viscosity under high temperature environment. When the amount of the polymerization inhibitor is 3% by mass or less, the resultant ink can be improved in curing ability.

<<Surfactant>>

The surfactant is not particularly limited and may be appropriately selected depending on the intended purpose. Examples of the surfactant include a higher fatty acid surfactant, a silicone surfactant, and a fluorine surfactant.

An amount of the surfactant is preferably OA % by mass or more but 3% by mass or less, more preferably 0.2% by mass or more but 1% by mass or less, relative to the total amount of the active-energy-ray-curable composition. When the amount of the surfactant is 0.1% by mass or more, the resultant ink can be improved in wettability. When the amount of the surfactant is 3% by mass or less, the resultant ink can be improved in curing ability. When the amount of the surfactant falls within the more preferable range, the resultant ink can be improved in wettability and leveling property.

<Organic Solvent>

The active-energy-ray-curable composition of the present disclosure optionally contains an organic solvent although it is preferable to spare it. The curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1 percent by mass.

<Dispersion Method>

As a method for dispersing the active-energy-ray-curable composition of the present disclosure, a dispersing device including media such as ball mills, sand mills, and bead mills may be used, and a medialess dispersion device may be used.

As the dispersion media used in the dispersing device including media, zirconia beads are preferably used in terms of dispersibility and dispersion efficiency. These dispersion methods may be used in combination thereof. For example, dispersing using ball mills makes it possible to obtain a dispersion liquid having a homogeneous particle size distribution by performing a two-step dispersion, where the two-step dispersion includes a step of dispersing materials using zirconia beads having a diameter of 2 mm, and a step of dispersing the materials using zirconia beads having a diameter of 1 mm.

The medialess dispersion device does not excessively apply energy to the cyan pigment, and thus cyan pigment particles do not cause fracture. As a result, adsorption of the dispersant polymer particles on the surface of the cyan pigment particles is facilitated, which can result in excellent dispersion stability. Moreover, the medialess dispersion device does not cause excessive dispersion, and contamination derived from media does not occur, and thus a system in the device can be prevented from occurrence of fine particles and coarse particles. This can reduce curing inhibition by active energy rays, and can improve the ink in homogeneity of particle size distribution, which results in high ejecting ability of the ink.

Examples of the medialess dispersion device include a dispersing device using high-speed shear force such as collision dispersion and ultrasonic dispersion and a dispersion device using high-speed stirring.

Examples of the dispersing device using high-speed shear force include device name: Nano Vater series laboratory device NVC-ES008 (product of YOSHIDA KIKAI CO., LTD.).

A temperature of the dispersion liquid during dispersing is preferably 5° C. or more but 60° C. or less. When the temperature of the dispersion liquid is 5° C. or more but 60° C. or less, reaction of curing the monomer can be prevented. In order to inhibit curing reaction, a small amount of the polymerization inhibitor can be added to the dispersion liquid in advance.

<Preparation of Active-Energy-Ray-Curable Composition>

The active-energy-ray-curable composition of the present disclosure can be prepared by using the components described above. The preparation devices and conditions are not particularly limited. For example, the curable-composition can be prepared by subjecting a polymerizable monomer, a pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, an initiator, a polymerization initiator, and a surfactant.

<Active Energy Rays>

Active energy rays used for curing an active-energy-ray-curable composition of the present disclosure are not particularly limited, so long as they are able to give necessary energy for allowing polymerization reaction of polymerizable components in the composition to proceed. Examples of the active energy rays include electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

A light source of the active energy rays is not particularly limited and may be appropriately selected depending on the intended purpose. Examples of the light source include a mercury lamp, a metal halide lamp, and an UV-LED lamp.

The mercury lamp is a lamp obtained by encapsulating mercury (Hg) having high purity and a small amount of noble gas in an arc tube made of quartz glass. The mercury lamp has a dominant wavelength of 365 nm, effectively emits ultraviolet rays having a wavelength of 254 nm, 303 nm, and 313 nm, and has high output power of ultraviolet rays having a short wavelength.

The metal halide lamp is a lamp obtained by encapsulating mercury and a halogenated metal in an arc tube, emits an active energy ray spectrum falling within a broad range of 200 nm or more but 450 nm or less, and has high output power of ultraviolet rays having a long wavelength of 300 nm or more but 450 nm or less, compared to the mercury lamp.

The UV-LED lamp can reduce the environmental load due to a LED system (long lifetime and low electricity consumption), does not generate ozone, and is compact. Therefore, the UV-LED lamp is suitable for curing the active-energy-ray-curable composition of the present disclosure.

<Application Field>

The application field of the active-energy-ray-curable composition of the present disclosure is not particularly limited. It can be applied to any field where active-energy-ray-curable compositions are used. For example, the curable composition is selected to a particular application and used for a resin for processing, a paint, an adhesive, an insulant, a releasing agent, a coating material, a sealing material, various resists, and various optical materials.

Figure 2:
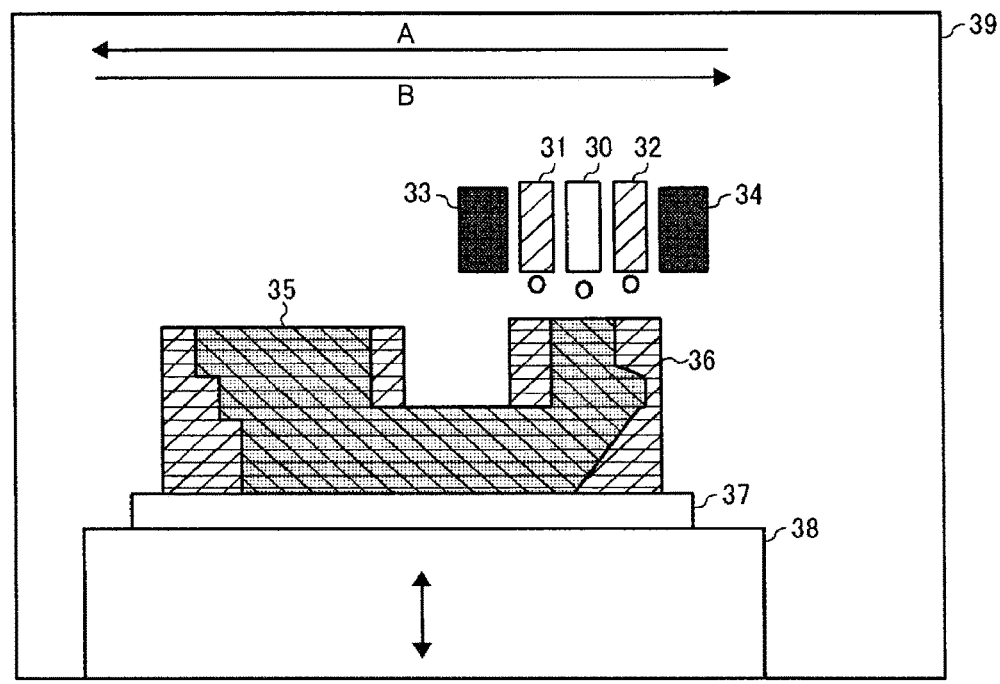
FIG. 2 is a schematic view of an example of another image forming apparatus of the present disclosure.
Figure 3A:
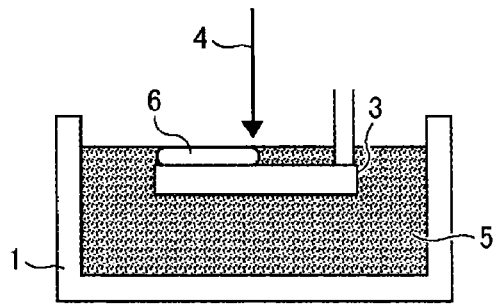
FIG. 3A is a schematic view of an example of still another image forming apparatus of the present disclosure.
Figure 3B:
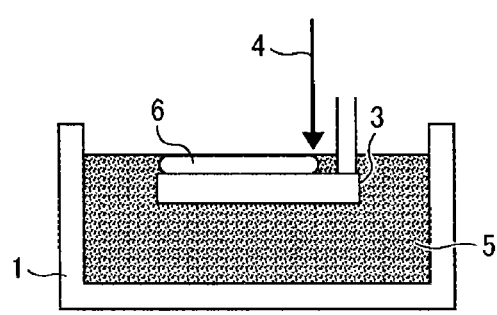
FIG. 3B is a schematic view of an example of still another image forming apparatus of the present disclosure.
Figure 3C:
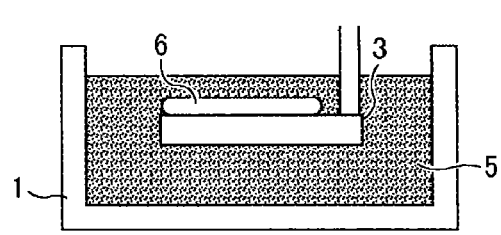
FIG. 3C is a schematic view of an example of still another image forming apparatus of the present disclosure.
Figure 3D:
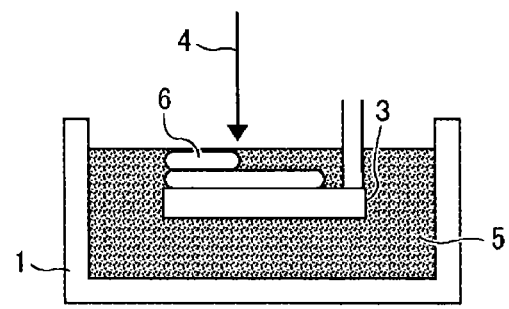
FIG. 3D is a schematic view of an example of still another image forming apparatus of the present disclosure.
Figure 4:
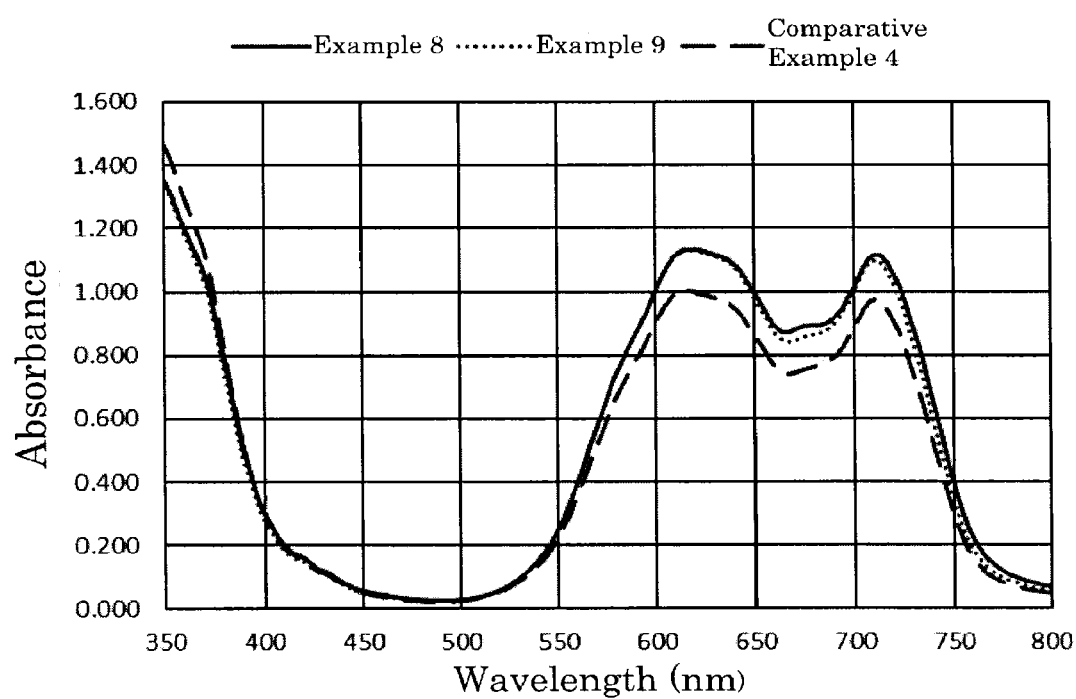
FIG. 4 is a graph of absorbance of each of the active-energy-ray-curable compositions of Example 8, Example 9, and Comparative Example 4.

Furthermore, the active-energy-ray-curable composition of the present disclosure can be used as an ink to form two-dimensional texts, images, and designed coating film on various substrates and in addition as a solid object forming material to form a three-dimensional object. This three dimensional object forming material may also be used as a binder for powder particles used in a powder layer laminating method of forming a three-dimensional object by repeating curing and layer-forming of powder layers, and as a three-dimensional object constituent material (a model material) and a supporting member used in an additive manufacturing method (a stereolithography method) as illustrated in FIG. 2, FIG. 3A, FIG. 3B, FIG. 3C, and FIG. 3D. FIG. 2 is a diagram illustrating a method of additive manufacturing to sequentially form layers of the active-energy-ray-curable composition of the present disclosure one on top of the other by repeating discharging the curable composition to particular areas followed by curing upon irradiation of an active energy ray. FIGS. 3A to 3D are each a diagram illustrating a method of additive manufacturing to sequentially form cured layers 6 having respective predetermined forms one on top of the other on a movable stage 3 by irradiating a storing pool (storing part) 1 of the active-energy-ray-curable composition 5 of the present disclosure with the active energy ray 4.

An apparatus for fabricating a three-dimensional object by the active-energy-ray-curable composition of the present disclosure is not particularly limited and can be a known apparatus. For example, the apparatus includes a containing device, a supplying device, and a discharging device of the curable composition, and an active energy ray irradiator.

In addition, the present disclosure includes cured materials obtained by curing the active-energy-ray-curable composition and processed products obtained by processing structures having the cured materials on a substrate. The processed product is fabricated by, for example, heat-drawing and punching a cured material or structure having a sheet-like form or film-like form. Examples thereof are gauges or operation panels of vehicles, office machines, electric and electronic machines, and cameras.

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

Moreover, drawability of the cured material of the present disclosure is preferably 50% or more, more preferably 100% or more when drawability at 180° C. is determined based on the following formula:

(length after tension test−length before tension test)/
(length before tension test).

(Active-Energy-Ray-Curable Ink)

An active-energy-ray-curable ink of the present disclosure (hereinafter may be referred to as "ink") contains the active-energy-ray-curable composition of the present disclosure, and is preferably used for inkjet.

A static surface tension of the active-energy-ray-curable ink at 25° C. is preferably 20 mN/m or more but 40 mN/m or less, more preferably 28 mN/m or more but 35 mN/m or less.

A static surface tension balance (product of Kyowa Interface Science Co., Ltd, CBVP-Z) is used to measure the static surface tension of the active-energy-ray-curable ink at 25° C. The static surface tension is on the assumption of the specifications of a commercially available inkjet ejection head such as GEN4 (product of Ricoh Printing Systems, Ltd.).

<Composition Stored Container>

The composition stored container of the present disclosure contains the active-energy-ray-curable composition and is suitable for the applications as described above. For example, if the active-energy-ray-curable composition of the present disclosure is used for ink, a container that stores the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

<Image Forming Method and Image Forming Apparatus>

The image forming method of the present disclosure includes at least an irradiating step of irradiating the curable composition of the present disclosure with an active energy ray to cure the curable composition. The image forming apparatus of the present disclosure includes at least an irradiator to irradiate the curable composition of the present disclosure with an active energy ray and a storing part containing the active-energy-ray-curable composition of the present disclosure. The storing part may include the container mentioned above. Furthermore, the method and the apparatus may respectively include a discharging step and a discharging device to discharge the active-energy-ray-curable composition. The method of discharging the curable composition is not particularly limited, and examples thereof include a continuous jetting method and an on-demand method. The on-demand method includes a piezo method, a thermal method, an electrostatic method, etc.

FIG. 1 is a diagram illustrating a two-dimensional image forming apparatus equipped with an inkjet discharging device. Printing units 23a, 23b, 23c, and 23d respectively having ink cartridges and discharging heads for yellow, magenta, cyan, and black active-energy-ray-curable inks discharge the inks onto a recording medium 22 fed from a supplying roller 21. Thereafter, light sources 24a, 24b, 24c, and 24d configured to cure the inks emit active energy rays to the inks, thereby curing the inks to form a color image. Thereafter, the recording medium 22 is conveyed to a processing unit 25 and a printed matter reeling roll 26. Each of the printing unit 23a, 23b, 23c and 23d may have a heating mechanism to liquidize the ink at the ink discharging portion. Moreover, in another embodiment of the present disclosure, a mechanism may optionally be included to cool down the recording medium to around room temperature in a contact or non-contact manner. In addition, the inkjet recording method may be either of serial methods or line methods. The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 22 is not particularly limited. Specific examples thereof include, but are not limited to, paper, film, metal, or complex materials thereof. The recording medium 22 takes a sheet-like form but is not limited thereto. The image forming apparatus may have a one-side printing configuration and/or a two-side printing configuration.

Optionally, multiple colors can be printed with no or weak active energy ray from the light sources 24a, 24b, and 24c followed by irradiation of the active energy ray from the light source 24d. As a result, energy and cost can be saved.

The recorded matter having images printed with the ink of the present disclosure includes articles having printed images or texts on a plain surface of conventional paper, resin film, etc., a rough surface, or a surface made of various materials such as metal or ceramic. In addition, by laminating layers of images in part or the entire of a recording medium, a partially stereoscopic image (formed of two dimensional part and three-dimensional part) and a three dimensional objects can be fabricated.

FIG. 2 is a schematic diagram illustrating another example of the image forming apparatus (apparatus to fabricate a 3D object) of the present disclosure. An image forming illustrated in FIG. 2 sequentially forms thin layers one on top of the other using a head unit having inkjet heads arranged movable in the directions indicated by the arrows A and B. In the image forming apparatus 39, an ejection head unit 30 for additive manufacturing ejects a first active-energy-ray-curable composition, and ejection head units 31 and 32 for support and curing these compositions ejects a second active-energy-ray-curable composition having a different composition from the first active-energy-ray-curable composition, while ultraviolet irradiators 33 and 34 adjacent to the ejection head units 31 and 32 cure the compositions. To be more specific, for example, after the ejection head units 31 and 32 for support eject the second active-energy-ray-curable composition onto a substrate 37 for additive manufacturing and the second active-energy-ray-curable composition is solidified by irradiation of an active energy ray to form a first substrate layer having a space for composition, the ejection head unit 30 for additive manufacturing ejects the first active-energy-ray-curable composition onto the pool followed by irradiation of an active energy ray for solidification, thereby forming a first additive manufacturing layer. This step is repeated multiple times lowering the stage 38 movable in the vertical direction to laminate the supporting layer (or support layer) and the additive manufacturing layer to fabricate a solid object 35. Thereafter, an additive manufacturing support 36 is removed, if desired. Although only a single ejection head unit 30 for additive manufacturing is provided to the image forming apparatus illustrated 39 in FIG. 2, it can have two or more units 30.

(Two-Dimensional or Three-Dimensional Image)

A two-dimensional or three-dimensional image of the present disclosure is obtained through curing by applying active energy rays to the active-energy-ray-curable composition of the present disclosure or the active-energy-ray-curable ink of the present disclosure on a base.

Examples of the two-dimensional or three-dimensional image recorded using the active-energy-ray-curable ink of the present disclosure includes a two-dimensional or three-dimensional image recorded on a smooth surface of plain paper or a resin film, a two-dimensional or three-dimensional image recorded on a concave-convex surface of the recording medium, and a two-dimensional or three-dimensional image on a surface of the recording medium formed of various materials such as metal and ceramic.

Examples of the two-dimensional image include a character, a symbol, a figure, a combination thereof, and a solid image.

Examples of the three-dimensional image include a three-dimensional object.

A thickness of the three-dimensional object is not particularly limited and may be appropriately selected depending on the intended purpose, but it is preferably 10 µm or more.

The two-dimensional or three-dimensional image contains at least one of the active-energy-ray-curable composition of the present disclosure and the active-energy-raycurable ink of the present disclosure. Therefore, the two-dimensional or three-dimensional image formed on an impermeable base can be excellent in close adhesiveness and water resistance even if it is immersed in water.

The two-dimensional or three-dimensional image is preferably cured using a light-emitting diode.

(Structure)

A structure of the present disclosure contains a base and the two-dimensional or three-dimensional image of the present disclosure on the base.

The base is not particularly limited and may be appropriately selected depending on the intended purpose.

(Processed Product)

A processed product of the present disclosure can be obtained by drawing the two-dimensional or three-dimensional image of the present disclosure or the structure of the present disclosure.

EXAMPLES

The present disclosure will be described with reference the following Examples. However, it should be noted that the present disclosure is not limited to these Examples.

Moreover, absorbance, change of viscosity (ΔV), a 50% cumulative volume particle diameter ($D_{50}$) in the active-energy-ray-curable composition, distribution width of particle size distribution, and an amine value of the dispersant polymer were determined as follows.

<Absorbance>

A spectrophotometer (device name:U-3900H, product of Hitachi High-Technologies Corporation) was used to measure absorbance of the obtained active-energy-ray-curable composition, in which a concentration of the cyan pigment was adjusted to 0.0020% by mass by diluting the cyan pigment in the polymerizable compound as the dispersion medium.

<Change of Viscosity (ΔV)>

A cone plate rotary viscometer (device name: VISCOMETER TVE-22L, product of Toki Sangyo Co., Ltd.) with a cone rotor (1°34'×R24) was used to measure an initial viscosity at 25° C. ($V_0$) immediately after preparing the active-energy-ray-curable composition under the following conditions (temperature of circulating water: 25° C., number of rotations: 50 rpm, shear velocity: 191.4 sec$^{-1}$). Next, the active-energy-ray-curable composition was left to stand at 70° C. for 14 days. Then, the viscosity at 25° C. after storage (V) was measured in the same manner as in the measurement of the initial viscosity. The change of viscosity (ΔV) was calculated based on the following Formula (2). When the change of viscosity (ΔV) is low, the active-energy-ray-curable composition is excellent in storage stability and dispersibility.

Change of viscosity (ΔV)(%)=|V−$V_0$|/$V_0$×100     Formula (2)

<50% Cumulative Volume Particle Diameter ($D_{50}$) and Distribution Width of Particle Size Distribution>

The obtained active-energy-ray-curable composition was diluted in the polymerizable compound as the dispersion medium at 500-fold to measure the 50% cumulative volume particle diameter ($D_{50}$) thereof using a particle size analyzer (device name: UPA150, product of NIKKISO CO., LTD.).

The distribution width of particle size distribution was determined based on the following Formula (1). Here, in the Formula (1) the 84% cumulative volume particle diameter and the 16% cumulative volume particle diameter were measured in the same manner as in the measurement of the 50% cumulative volume particle diameter ($D_{50}$).

Distribution Width of Particle Size Distribution=
(84% cumulative volume particle diameter−16%
cumulative volume particle diameter)/2     Formula (1)

<Amine Value of the Dispersant Polymer>

The dispersant polymer (1 g) was dissolved in methyl isobutyl ketone (100 mL). Then, potentiometric titration was performed using a 0.01 mol/L chloric acid methyl isobutyl ketone solution to measure a potential difference. The obtained potential difference was used to calculate the amine value of the dispersant polymer. Here, an automatic titrator (device name: GT-200, product of Mitsubishi Chemical Analytech, Co., Ltd.) was used to perform the potentiometric titration.

(Preparation Example 1 of Cyan Pigment Dispersion Liquid)

<Preparation of Cyan Pigment Dispersion Liquid A>

A dispersant polymer (product name: AJISPER PB-822, product of Ajinomoto Fine-Techno Co., Inc., amine value: 18.2 mg KOH/g) (5 parts by mass) was charged into benzyl acrylate (product name: VISCOAT #160, product of Osaka Organic Chemical Industry Ltd., structural formula: the following formula (M-3)) (75 parts by mass). Then, the resultant mixture was stirred and dissolved at 40° C. for 4 hours, to prepare a dispersion medium.

Zirconia balls having a diameter of 2 mm (80 parts by mass), C.I. pigment blue 15:4 (product name: LX-8091, product of TOYOCOLOR CO., LTD) (4.5 parts by mass), and the dispersion medium (18 parts by mass) were charged into a 70 mL-mayonnaise jar (product name: UM sample jar, product of AS ONE Corporation), and then were dispersed for 3 days by a ball mill under the following conditions to prepare [cyan pigment dispersion liquid A] (solid concentration of the pigment: 20% by mass).

—Conditions of Ball Mill—

Media: YTZ ball, diameter of 2 mm (zirconia balls, product of NIKKATO CORPORATION)

Mill: MIX-ROTAR VMR-5 (product of AS ONE Corporation)

Number of rotations: number of rotations of mayonnaise jar 75 rpm

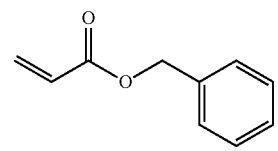

Formula (M-3)

(Preparation Examples 2 to 11 of Cyan Pigment Dispersion Liquids)

<Preparation of Cyan Pigment Dispersion Liquids B, D, E, G, H, J, and K to N>

Cyan pigment dispersion liquids B, D, E, G, H, J, and K to N were prepared in the same manner as in Preparation Example 1 of the cyan pigment dispersion liquid except that the cyan pigment, the dispersant polymer, and the polymerizable compound were each changed to the materials given in Table 1 below. Here, all of the solid concentrations of the pigments were 20% by mass.

(Preparation Example 12 of Cyan Pigment Dispersion Liquid)

<Preparation of Cyan Pigment Dispersion Liquid C>

A dispersant polymer (product name: BYKJET-9151, product of BYK Japan KK, amine value: 17.2 mg KOH/g) (5 parts by mass) was charged into phenoxyethyl acrylate (product name: VISCOAT #192, product of Osaka Organic Chemical Industry Ltd., structural formula: the following formula (M-1)) (75 parts by mass), and the resultant mixture was stirred and dissolved at 40° C. for 4 hours, to prepare a dispersion medium.

Then, C.I. pigment blue 15:4 (product name: LX-8091, product of TOYOCOLOR CO., LTD) (45 parts by mass) and the dispersion medium (180 parts by mass) were charged into an Erlenmeyer flask (300 mL), and were subjected to pre-dispersion for 10 minutes using a homogenizer under the following conditions. Then, the mixture was dispersed for 60 minutes using a bead mill under the following conditions, to prepare [cyan pigment dispersion liquid C] (solid concentration of the pigment: 20% by mass).
—Conditions of Homogenizer—
Homogenizer: HG30, C20 cutter (product of Hitachi Koki Co., Ltd.)
Number of rotations: 10,000 rpm
—Conditions of Ball Mill—
Mill: Dinomill MultiLab
Media: YTZ ball, diameter of 0.3 mm (zirconia balls, product of NIKKATO CORPORATION)
Circumferential velocity: 8 m/s

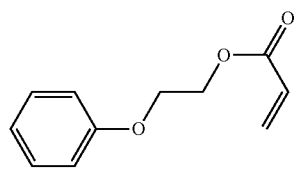

Formula (M-1)

(Preparation Example 13 of Cyan Pigment Dispersion Liquid)
<Preparation of Cyan Pigment Dispersion Liquid F>
A dispersant polymer (product name: BYKJET-9152, product of BYK Japan KK, amine value: 27.3 mg KOH/g) (5 parts by mass) was charged into phenoxyethyl acrylate (product name: VISCOAT #192, product of Osaka Organic Chemical Industry Ltd.) (75 parts by mass), and the resultant mixture was stirred and dissolved at 40° C. for 4 hours, to prepare a dispersion medium.

Then, C.I. pigment blue 15:4 (product name: D7110, product of BASF) (45 parts by mass) and the dispersion medium (180 parts by mass) were charged into a 70 mL-mayonnaise jar, and were subjected to dispersion for 8 hours using a ball-mill. Zirconia balls having a diameter of 5 mm were removed, and then zirconia balls having a diameter of 2 mm (80 parts) were added thereto. Then, the resultant mixture was further dispersed for 2 days using a ball-mill, to prepare [cyan pigment dispersion liquid F] (solid concentration of the pigment: 20% by mass).
Media: YTZ ball, diameter of 5 mm (product of NIKKATO CORPORATION, zirconia balls)
YTZ ball, diameter of 2 mm (product of NIKKATO CORPORATION, zirconia balls)
Mill: MIX-ROTAR VMR-5 (product of AS ONE Corporation)
Number of rotations: number of rotations of the jar 75 rpm
(Preparation Example 14 of Cyan Pigment Dispersion Liquid)
<Preparation of Cyan Pigment Dispersion Liquid I>
A dispersant polymer (product name: BYKJET-9151, product of BYK Japan KK, amine value: 17.2 mg KOH/g) (5 parts by mass) was charged into phenoxyethyl acrylate (product name: VISCOAT #192, product of Osaka Organic Chemical Industry Ltd.) (75 parts by mass), and then the resultant mixture was stirred and dissolved at 40° C. for 4 hours, to prepare a dispersion medium.

Then, C.I. pigment blue 15:4 (product name: D7110F, product of BASF) (45 parts by mass), and the dispersion medium (180 parts by mass) were charged into an Erlenmeyer flask (300 mL), and were subjected to pre-dispersion for 10 minutes using a homogenizer under the following conditions. Then, the mixture was dispersed using a media-less dispersion device at a treatment pressure of 150 MPa, to prepare [cyan pigment dispersion liquid I] (solid concentration of the pigment: 20% by mass).
—Conditions of Homogenizer—
Homogenizer: HG30, C20 cutter (product of Hitachi Koki Co., Ltd.)
Number of rotations: 8,000 rpm
—Conditions of Medialess Dispersion Device—
Medialess dispersion device: NVC-ES008 (product of YOSHIDA KIKAI CO., LTD.)
Nozzle: cross (X-type)
Treatment pressure: 150 MPa
Number of passes: 30

Formulations and dispersing methods of the obtained cyan pigment dispersion liquids A to N are given in Table 1.

TABLE 1

| Cyan dispersion liquid | Cyan pigment Compound | Product name | Amount (% by mass) | Dispersant polymer Product name | Amine value (mg KOH/g) | Amount (% by mass) | Monofunctional polymerizable compound Compound | Amount (% by mass) | Dispersion method |
|---|---|---|---|---|---|---|---|---|---|
| A | C.I. pigment blue 15:4 | LX-8091 | 20 | AJISPER PB-822 | 18.2 | 5 | Benzyl acrylate | 75 | Ball mill |
| B | C.I. pigment blue 15:4 | LX-8091 | 20 | AJISPER PB-822 | 18.2 | 5 | Acryloyl morpholine | 75 | Ball mill |
| C | C.I. pigment blue 15:4 | LX-8091 | 20 | BYKJET-9151 | 17.2 | 5 | Phenoxyethyl acrylate | 75 | Bead mill |
| D | C.I. pigment blue 15:4 | LX-8091 | 20 | DISPER BYK-2200 | 30.7 | 5 | Phenoxyethyl acrylate | 75 | Ball mill |
| E | C.I. pigment blue 15:4 | D7110F | 20 | BYKJET-9152 | 27.3 | 5 | Phenoxyethyl acrylate | 75 | Ball mill |
| F | C.I. pigment blue 15:4 | D7110F | 20 | BYKJET-9152 | 27.3 | 5 | Phenoxyethyl acrylate | 75 | Two-step ball mill |
| G | C.I. pigment blue 15:4 | D7110F | 20 | AJISPER PB-822 | 18.2 | 5 | Phenoxyethyl acrylate | 75 | Ball mill |
| H | C.I. pigment blue 15:4 | D7110F | 20 | BYKJET-9151 | 17.2 | 5 | Phenoxyethyl acrylate | 75 | Ball mill |

TABLE 1-continued

| Cyan dispersion liquid | Cyan pigment Compound | Product name | Amount (% by mass) | Dispersant polymer Product name | Amine value (mg KOH/g) | Amount (% by mass) | Monofunctional polymerizable compound Compound | Amount (% by mass) | Dispersion method |
|---|---|---|---|---|---|---|---|---|---|
| I | C.I. pigment blue 15:4 | D7110F | 20 | BYKJET-9151 | 17.2 | 5 | Phenoxyethyl acrylate | 75 | Media-less |
| J | C.I. pigment blue 15:3 | D7079 | 20 | BYKJET-9152 | 27.3 | 5 | Phenoxyethyl acrylate | 75 | Ball mill |
| K | C.I. pigment blue 15:4 | LX-8091 | 20 | SOLSPERSE 39000 | 25.7 | 5 | Phenoxyethyl acrylate | 75 | Ball mill |
| L | C.I. pigment blue 15:4 | D7110F | 20 | SOLSPERSE 39000 | 25.7 | 5 | Phenoxyethyl acrylate | 75 | Ball mill |
| M | C.I. pigment blue 15:3 | B4G | 20 | BYKJET-9151 | 17.2 | 5 | Phenoxyethyl acrylate | 75 | Ball mill |
| N | C.I. pigment blue 15:3 | B4G | 20 | AJISPER PB-822 | 18.2 | 5 | Benzyl acrylate | 75 | Ball mill |

Note that, product names and manufactured companies of the components given in Table 1 are as follows.

LX-8091: C.I. pigment blue 15:4, product of TOYO-COLOR CO., LTD
D7110F: C.I. pigment blue 15:4, product of BASF
D7079: C.I. pigment blue 15:3, product of BASF
B4G: C.I. pigment blue 15:3, product of Clariant (Japan) K.K.
AJISPER PB-822: product of Ajinomoto Fine-Techno Co., Inc., amine value: 18.2 mg KOH/g
BYKJET-9151: product of BYK Japan KK, amine value: 17.2 mg KOH/g
DISPERBYK-2200: product of BYK Japan KK, amine value: 30.7 mg KOH/g
BYKJET-9152: product of BYK Japan KK, amine value: 27.3 mg KOH/g
SOLSPERSE 39000: product of The Lubrizol Corporation, amine value: 25.7 mg KOH/g
Benzyl acrylate: product of Osaka Organic Chemical Industry Ltd., product name: VISCOAT #160, structural formula: the following formula (M-3))

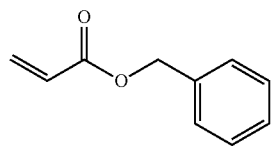

Formula (M-3)

Acryloyl morpholine: product of KOHJIN Film & Chemicals Co., Ltd., product name: ACMO, structural formula: the following formula (M-2)

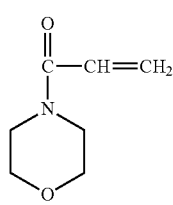

Formula (M-2)

Phenoxyethyl acrylate: product of Osaka Organic Chemical Industry Ltd., product name: VISCOAT #192, structural formula: the following formula (M-1)

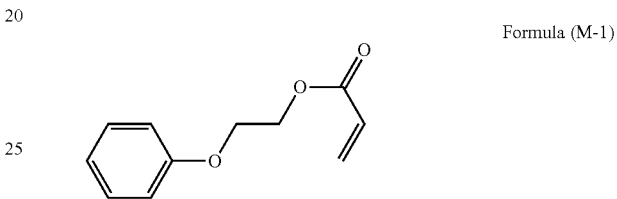

Formula (M-1)

Example 1

Cyan pigment dispersion liquid A (10.0 parts by mass), acryloyl morpholine (product name: ACMO, product of KJ Chemicals Corporation, monofunctional monomer) (15.0 parts by mass), benzyl acrylate (product name: VISCOAT #192, product of Osaka Organic Chemical Industry Ltd., monofunctional monomer) (53.5 parts by mass), 1,9-nonanediol diacrylate (product name: VISCOAT #260, product of Osaka Organic Chemical Industry Ltd., bifunctional monomer) (1.0 parts by mass), an urethane acrylate resin (product name: UV-3010B, product of The Nippon Synthetic Chemical Industry Co., Ltd., ultraviolet curing resin) (5.5 parts by mass), surfactant A (product name: BYK-3575, product of BYK Japan KK) (0.3 parts by mass), polymerization initiator A (product name: Irgacure 819, product of BASF) (6.0 parts by mass), polymerization initiator B (product name: DAROCURE TPO, product of BASF) (5.0 parts by mass), polymerization initiator C (product name: Speedcure DETX, product of Lambson) (3.5 parts by mass), and p-methoxyphenol (product of Nippon Kayaku Co., Ltd.) (0.2 parts by mass) were mixed to obtain active-energy-ray-curable composition 1.

Examples 2 to 10 and Comparative Examples 1 to 4

Active-energy-ray-curable compositions 2 to 14 were obtained in the same manner as in Example 1 except that the amounts and the compounds of Example 1 were changed to the amounts and the compounds given in the following Tables 2-1, 2-2, 3-1, and 3-2. Formulations and amounts of Examples 1 to 10 and Comparative Examples 1 to 4 are given in Tables 2-1, 2-2, 3-1, and 3-2 below, and properties of active-energy-ray-curable compositions of Examples 1 to 10 and Comparative Examples 1 to 4 are given in Table 4 below. Moreover, a graph of absorbance of each of the active-energy-ray-curable compositions of Example 8, Example 9, and Comparative Example 4 is given in Table 4.

TABLE 2-1

| | | | Examples | | | |
|---|---|---|---|---|---|---|
| | | | 1 | 2 | 3 | 4 |
| Cyan pigment dispersion liquid | Compound | | A | B | C | D |
| | Amount | | 10.0 | 10.0 | 10.0 | 10.0 |
| Polymerizable compound | Monofunctional Monomer | Phenoxyethyl acrylate | — | — | 53.5 | 53.5 |
| | | Acryloyl morpholin | 15.0 | 53.5 | — | — |
| | | Benzyl acrylate | 53.5 | 15.0 | — | — |
| | | Isobornyl acrylate | — | — | 15.0 | 15.0 |
| | Bifunctional Monomer | 1,9-Nonane diol acrylate | 1.0 | 1.0 | 1.0 | 1.0 |
| Ultraviolet curing resin | | Urethane acrylate | 5.5 | 5.5 | 5.5 | 5.5 |
| Surfactant | | Surfactant A | 0.3 | 0.3 | 0.3 | 0.3 |
| | | Surfactant B | — | — | — | — |
| Polymerization initiator | | Polymerization initiator A | 6.0 | 6.0 | 6.0 | 6.0 |
| | | Polymerization initiator B | 5.0 | 5.0 | 6.0 | 5.0 |
| | | Polymerization initiator C | 3.5 | 3.5 | 2.5 | 3.5 |
| Polymerization inhibitor | | p-Methoxyphenol | 0.2 | 0.2 | 0.2 | 0.2 |
| Total (% by mass) | | | 100 | 100 | 100 | 100 |

TABLE 2-2

| | | | Examples | | |
|---|---|---|---|---|---|
| | | | 5 | 6 | 7 |
| Cyan pigment dispersion liquid | Compound | | E | F | G |
| | Amount | | 10.0 | 10.0 | 10.0 |
| Polymerizable compound | Monofunctional Monomer | Phenoxyethyl acrylate | 53.5 | 53.5 | 53.5 |
| | | Acryloyl morpholin | — | — | — |
| | | Benzyl acrylate | — | — | — |
| | | Isobornyl acrylate | 15.0 | 15.0 | 15.0 |
| | Bifunctional Monomer | 1,9-Nonane diol acrylate | 1.0 | 1.0 | 1.0 |
| Ultraviolet curing resin | | Urethane acrylate | 5.5 | 5.5 | 5.5 |
| Surfactant | | Surfactant A | — | — | 0.3 |
| | | Surfactant B | 0.3 | 0.3 | — |
| Polymerization initiator | | Polymerization initiator A | 7.0 | 7.0 | 7.0 |
| | | Polymerization initiator B | 5.0 | 5.0 | 5.0 |
| | | Polymerization initiator C | 2.5 | 2.5 | 2.5 |
| Polymerization inhibitor | | p-Methoxyphenol | 0.2 | 0.2 | 0.2 |
| Total (% by mass) | | | 100 | 100 | 100 |

TABLE 3-1

| | | | Examples | | |
|---|---|---|---|---|---|
| | | | 8 | 9 | 10 |
| Cyan pigment dispersion liquid | Compound | | H | I | J |
| | Amount | | 10.0 | 10.0 | 10.0 |
| Polymerizable compound | Monofunctional Monomer | Phenoxyethyl acrylate | 53.5 | 53.5 | 53.5 |
| | | Acryloyl morpholin | — | — | — |
| | | Benzyl acrylate | — | — | — |
| | | Isobornyl acrylate | 15.0 | 15.0 | 15.0 |
| | Bifunctional Monomer | 1,9-Nonane diol acrylate | 1.0 | 1.0 | 1.0 |
| Ultraviolet curing resin | | Urethane acrylate | 5.5 | 5.5 | 5.5 |
| Surfactant | | Surfactant A | — | — | 0.3 |
| | | Surfactant B | 0.3 | 0.3 | — |
| Polymerization initiator | | Polymerization initiator A | 5.0 | 6.0 | 6.5 |
| | | Polymerization initiator B | 6.0 | 6.0 | 5.5 |
| | | Polymerization initiator C | 3.5 | 2.5 | 2.5 |
| Polymerization inhibitor | | p-Methoxyphenol | 0.2 | 0.2 | 0.2 |
| Total (% by mass) | | | 100 | 100 | 100 |

TABLE 3-2

| | | | Comparative Examples | | | |
|---|---|---|---|---|---|---|
| | | | 1 | 2 | 3 | 4 |
| Cyan pigment dispersion liquid | Compound | | K | L | M | N |
| | Amount | | 10.0 | 10.0 | 10.0 | 10.0 |
| Polymerizable compound | Monofunctional Monomer | Phenoxyethyl acrylate | 53.5 | 53.5 | 53.5 | — |
| | | Acryloyl morpholin | — | — | — | 53.5 |
| | | Benzyl acrylate | — | — | — | 15.0 |
| | | Isobornyl acrylate | 15.0 | 15.0 | 15.0 | — |
| | Bifunctional Monomer | 1,9-Nonane diol acrylate | 1.0 | 1.0 | 1.0 | 1.0 |
| Ultraviolet curing resin | | Urethane acrylate | 5.5 | 5.5 | 5.5 | 5.5 |
| Surfactant | | Surfactant A | 0.3 | 0.3 | 0.3 | — |
| | | Surfactant B | — | — | — | 0.3 |
| Polymerization initiator | | Polymerization initiator A | 6.0 | 5.0 | 6.5 | 6.5 |
| | | Polymerization initiator B | 5.0 | 6.0 | 5.5 | 5.5 |
| | | Polymerization initiator C | 3.5 | 3.5 | 2.5 | 2.5 |
| Polymerization inhibitor | | p-Methoxyphenol | 0.2 | 0.2 | 0.2 | 0.2 |
| Total (% by mass) | | | 100 | 100 | 100 | 100 |

Note that, product names and manufactured companies of the components in the Tables 2-1, 2-2, 3-1, and 3-2 are as follows.

Phenoxyethyl acrylate: product of Osaka Organic Chemical Industry Ltd., product name: VISCOAT #192, structural formula: the following formula (M-1).

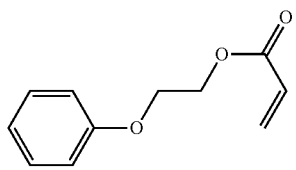

Formula (M-1)

Acryloyl morpholine: product of KJ Chemicals Corporation, product name: ACMO, monofunctional monomer
Benzyl acrylate: product of Osaka Organic Chemical Industry Ltd., product name: VISCOAT #192, monofunctional monomer
Iso-bornyl acrylate: product of Osaka Organic Chemical Industry Ltd., product name: IBXA, monofunctional monomer
1,9-Nonanediol diacrylate: product of Osaka Organic Chemical Industry Ltd., product name: VISCOAT #260, bifunctional monomer
Urethane acrylate resin: product of The Nippon Synthetic Chemical Industry Co., Ltd., product name: UV-3010B
Surfactant A: product of BYK Japan KK, product name: BYK-3575
Surfactant B: product of BYK Japan KK, product name: BYK-3510
Polymerization initiator A: product of BASF, product name: Irgacure 819
Polymerization initiator B: product of BASF, product name: DAROCURE TPO
Polymerization initiator C: product of Lambson, product name: Speedcure DETX
Polymerization inhibitor: product of Nippon Kayaku Co., Ltd., compound: p-methoxyphenol a temperature of the inkjet head was adjusted so that viscosity of the composition was 10 mPa·s to eject the composition at 3 kHz. Then, "initial ejecting ability" was evaluated based on the following evaluation criteria. Next, "ejecting ability after storage" was evaluated in the same manner as in the evaluation of "initial ejecting ability" except that the active-energy-ray-curable composition immediately after being prepared was changed to the active-energy-ray-curable composition stored at 70° C. for 14 days. Here, a cone plate viscometer capable of adjusting a temperature was used under such a temperature condition that viscosity of the ink is 10.0 mPa·s±0.5 m Pa·s.
—Evaluation Criteria—
A: The composition was ejected.
B: The composition was not ejected.
<Colorability>
A printer for evaluation obtained by modifying a printer (device name: SG7100, product of Ricoh Company, Ltd.) was used to obtain a solid image of the obtained active-energy-ray-curable composition (10 cm×10 cm) on a recording medium (product name: COSMOSHINE A4300 coat PET film, product of TOYOBO CO., LTD., average thickness: 100 μm, color: transparent). The obtained solid image was subjected to curing treatment at an illuminance of 1 W/cm$^2$, and an irradiation dose of 500 mJ/cm$^2$, using an UV-LED device for an inkjet printer (device name: UV-LED module (single-pass water cooling, product of USHIO INC.), to obtain an image (cured material) (10 cm×10 cm) having an average thickness of 10 μm.
Here, an ultraviolet intensity meter (device name: UM-10) and a receiver (device name: UM-400) (both products of KONICA MINOLTA, INC.) were used to measure an irradiation dose. As a method for measuring the average thickness, a thickness of the image was measured using an

TABLE 4

| | | Absorbance at wavelength of 385 nm $A_{385}$ (nm) | Absorbance at wavelength of 620 nm $A_{620}$ (nm) | Ratio of absorbance ($A_{385}/A_{620}$) | Change of viscosity ($\Delta V$) (%) | 50% Cumulative volume particle diameter ($D_{50}$) (nm) | Distribution width of particle size distribution (nm) |
|---|---|---|---|---|---|---|---|
| Examples | 1 | 0.71 | 1.13 | 0.63 | 3.6 | 133 | 57 |
| | 2 | 0.72 | 1.12 | 0.64 | 7.5 | 166 | 67 |
| | 3 | 0.61 | 1.14 | 0.54 | 1.3 | 125 | 49 |
| | 4 | 0.64 | 1.12 | 0.57 | 2.1 | 116 | 62 |
| | 5 | 0.66 | 1.10 | 0.60 | 3.8 | 130 | 51 |
| | 6 | 0.62 | 1.16 | 0.54 | 2.1 | 115 | 48 |
| | 7 | 0.63 | 1.11 | 0.57 | 8.4 | 148 | 62 |
| | 8 | 0.64 | 1.13 | 0.56 | 4.1 | 113 | 56 |
| | 9 | 0.60 | 1.13 | 0.53 | 3.2 | 102 | 44 |
| | 10 | 0.64 | 1.07 | 0.60 | 12 | 171 | 68 |
| Comparative Examples | 1 | 0.64 | 0.94 | 0.68 | 26 | 164 | 65 |
| | 2 | 0.63 | 0.96 | 0.66 | 34 | 150 | 67 |
| | 3 | 0.63 | 0.93 | 0.68 | 68 | 209 | 71 |
| | 4 | 0.66 | 1.00 | 0.66 | 84 | 176 | 66 |

The obtained active-energy-ray-curable compositions 1 to 14 of Examples 1 to 10 and Comparative Examples 1 to 4 were evaluated for "ejecting ability", "colorability", "curing ability", and "close adhesiveness" as described below. Evaluation results are given in Table 5.
<Initial Ejecting Ability and Ejection Ability after Storage>
A piezo inkjet head (product name: GEN4, product of Ricoh Industry Company, Ltd.) capable of adjusting a temperature of ink from an ink supplying system to a head part was loaded with each of the active-energy-ray-curable compositions of Examples 1 to 10 and Comparative Examples 1 to 4 immediately after preparing these compositions. Next, electronic micrometer (product of ANRITSU CORPORATION), and then ten thicknesses of the images were used to calculate the average thickness. The printer for evaluation includes a conveying part of SG7100 and a driving part of SG7100, but its head is changed to a MH2620 head (product of Ricoh Company, Ltd.) capable of performing ejection by heat and responding to inks having high viscosity.
"Colorability" of the obtained image (cured material) was evaluated by measuring a density of the image (cured material) using a reflection spectral densitometer (device name: X-Rite 939, product of X-Rite). As the obtained value is large, the obtained image is excellent in colorability.

<Curing Ability>
—Evaluation of Curing Ability of the Surface—

The obtained active-energy-ray-curable composition was used to obtain an image (cured material) (10 cm×10 cm) having an average thickness of 10 μm in the same manner as in the evaluation of colorability. The obtained image (cured material) was rubbed ten times in a reciprocating manner using a white cotton attached to a crock meter (device name: NO416, product of YASUDA SEIKI SEISAKUSHO, LTD.) with a load of 50 g/cm². Then, a reflection spectral densitometer (device name: X-Rite 939, product of X-Rite) was used to measure a density of the white cotton before and after rubbing. The density before rubbing ten times in a reciprocating manner was deducted from the density after rubbing ten times in a reciprocating manner to obtain a calculated value. The obtained calculated value was evaluated for "curing ability" based on the following evaluation criteria.

—Evaluation Criteria—
A: 0.001 or less
B: More than 0.001 but 0.005 or less
C: More than 0.005 but 0.009 or less
D: More than 0.009

<Close Adhesiveness>
—Evaluation of Inner Curing Ability—

The obtained active-energy-ray-curable composition was used to obtain an image (cured material) (10 cm×10 cm) of an average thickness of 10 μm in the same manner as in the evaluation of colorability. A solid part of the obtained image (cured material) was cut with a cutter knife at 1 mm-intervals to have 100 squares of the solid image according to JIS K5400. Then, the solid image was peeled with a piece of an adhesive cellophane tape (product name: Scotch Mending tape (18 mm), product of 3M company). Squares that were not peeled were observed and counted with a loupe (product name: PEAK No. 1961 (×10), product of Tohkai Sangyo Co., Ltd) to evaluate "close adhesiveness" based on the following evaluation criteria.

—Evaluation Criteria—
A: Squares that were not pealed: 100 squares per 100 squares
B: Squares that were not pealed: 80 squares or more but 99 squares or less per 100 squares
C: Squares that were not pealed: 40 squares or more but 79 squares or less per 100 squares
D: Squares that were not pealed: 39 squares or less per 100 squares

TABLE 5

| | | Evaluation criteria | | | | |
|---|---|---|---|---|---|---|
| | | Initial ejecting ability | Ejecting ability after storage | Curing ability | Close adhesiveness | Colorability |
| Examples | 1 | A | A | B | B | 2.14 |
| | 2 | A | A | B | A | 2.09 |
| | 3 | A | A | A | A | 2.23 |
| | 4 | A | A | B | A | 2.09 |
| | 5 | A | A | B | B | 2.02 |
| | 6 | A | A | A | A | 2.31 |
| | 7 | A | A | B | A | 2.04 |
| | 8 | A | A | A | A | 2.17 |
| | 9 | A | A | A | A | 2.22 |
| | 10 | A | A | B | B | 2.02 |

TABLE 5-continued

| | | Evaluation criteria | | | | |
|---|---|---|---|---|---|---|
| | | Initial ejecting ability | Ejecting ability after storage | Curing ability | Close adhesiveness | Colorability |
| Comparative Examples | 1 | A | B | C | C | 1.91 |
| | 2 | A | B | C | C | 1.82 |
| | 3 | A | B | C | D | 1.79 |
| | 4 | A | B | D | D | 1.89 |

From the results in the Table 4 and the Table 5, it is found that the active-energy-ray-curable compositions of Examples 1 to 10 have low change of viscosity, and have good ejecting ability and dispersibility, and are excellent in curing ability and colorability.

Meanwhile, it is found that the active-energy-ray-curable compositions of Comparative Examples 1 to 4 have high change of viscosity, and have poor dispersion stability. Moreover, the active-energy-ray-curable compositions of Comparative Examples 1 and 2 contain the same pigment as the pigment used in the Examples, but are deteriorated in dispersion stability, curing ability, close adhesiveness, and colorability because of the difference in dispersing formulations. Therefore, the present disclosure can be satisfied by optimizing the dispersion formulations and the dispersion conditions.

Embodiments of the present disclosure are as follows, for example.

<1> An active-energy-ray-curable composition including:
a cyan pigment; and
a polymerizable compound,
wherein a ratio of absorbance at a wavelength of 385 nm to absorbance at a wavelength of 620 nm is 0.65 or less.
<2> The active-energy-ray-curable composition according to <1>, wherein the ratio is 0.57 or less.
<3> The active-energy-ray-curable composition according to <1> or <2>,
wherein a 50% cumulative volume particle diameter of the active-energy-ray-curable composition is 100 nm or more but 160 nm or less, and
wherein a distribution width of particle size distribution of the active-energy-ray-curable composition is 60 nm or less as determined by Formula (1) below, $$\text{Distribution width of particle size distribution} = (84\% \text{ cumulative volume particle diameter} - 16\% \text{ cumulative volume particle diameter})/2 \quad \text{Formula (1).}$$

<4> The active-energy-ray-curable composition according to any one of <1> to <3>,
wherein a coloring density of a cured material having an average thickness of 10 μm is 2.00 or more, where the cured material is obtained through curing by irradiating the active-energy-ray-curable composition with active energy rays having an illuminance of 1 W/cm² and an irradiation dose of 500 mJ/cm² on a base.
<5> The active-energy-ray-curable composition according to any one of <1> to <4>,
wherein the cyan pigment includes C.I. pigment blue 15:4.
<6> The active-energy-ray-curable composition according to any one of <1> to <5>,
wherein change of viscosity of the active-energy-ray-curable composition as determined by Formula (2) below is 15% or less, $$\text{Change of viscosity (\%)} = |V - V_0|/V_0 \times 100 \quad \text{Formula (2),}$$

where in the Formula (2), $V_0$ is a viscosity at 25° C. before storage, and V is a viscosity at 25° C. after storage at 70° C. for 14 days.
<7> The active-energy-ray-curable composition according to any one of <1> to <6>,
wherein the active-energy-ray-curable composition contains an amino group-containing dispersant polymer,
wherein an amine value of the amino group-containing dispersant polymer is 10 mg KOH/g or more but 30 mg KOH/g or less.
<8> The active-energy-ray-curable composition according to <6> or <7>,
wherein the change of viscosity is 10% or less.
<9> The active-energy-ray-curable composition according to any one of <6> to <8>,
wherein the change of viscosity is 5% or less.
<10> An active-energy-ray-curable ink including the active-energy-ray-curable composition according to any one of <1> to <9>.
<11> The active-energy-ray-curable ink according to <10>, wherein the active-energy-ray-curable ink is used for an inkjet.
<12> A composition stored container including:
a container; and
the active-energy-ray-curable composition according to any one of <1> to <9> in the container.
<13> An apparatus for forming a two-dimensional or three-dimensional image, the apparatus including:
a storing part containing the active-energy-ray-curable composition according to any one of <1> to <9>; and
an irradiator configured to irradiate the active-energy-ray-curable composition with active energy rays.
<14> The apparatus for forming the two-dimensional or three-dimensional image according to <11>, further including an ejecting device configured to eject the active-energy-ray-curable composition by an inkjet recording method.
<15> A method for forming a two-dimensional or three-dimensional image, the method including
irradiating the active-energy-ray-curable composition according to any one of <1> to <9> with active energy rays.
<16> The method for forming the two-dimensional or three-dimensional image according to <15>, further including ejecting the active-energy-ray-curable composition by an inkjet recording method.
<17> The method for forming the two-dimensional or three-dimensional image according to <15> or <16>,
wherein the active energy rays include light of a light-emitting diode.
<18> A two-dimensional or three-dimensional image, which is obtained by irradiating the active-energy-ray-curable composition according to any one of <1> to <9> with active energy rays.
<19> A structure including:
a base; and
the two-dimensional or three-dimensional image according to <18> on the base.
<20> A processed product, which is obtained by drawing the two-dimensional or three-dimensional image according to <18>, or the structure according to <19>.

The active-energy-ray-curable composition according to any one of <1> to <9>, the active-energy-ray-curable ink according to <10> or <11>, the composition stored container according to <12>, the apparatus for forming the two-dimensional or three-dimensional image according to <13> or <14>, the method for forming the two-dimensional or three-dimensional image according to any one of <15> to <17>, the two-dimensional or three-dimensional image according to <18>, the structure according to <19>, and the processed product according to <20> can solve the existing problems and can achieve the object of the present disclosure.

What is claimed is:

1. An active-energy-ray-curable composition, comprising:
a cyan pigment in particle form;
a dispersant polymer; and
a polymerizable compound,
wherein the cyan pigment comprises C.I. pigment blue 15:4, and
wherein a ratio of absorbance of the composition at a wavelength of 385 nm to absorbance of the composition at a wavelength of 620 nm ($A_{385}$, $A_{620}$) is 0.65 or less, and
wherein a distribution width of particle size distribution of pigment particles in the active-energy-ray-curable composition is 60 nm or less as determined by Formula (1):

Distribution width of particle size distribution=(84% cumulative volume particle diameter−16% cumulative volume particle diameter)/2   Formula (1).

2. The active-energy-ray-curable composition according to claim 1,
wherein an amount of the dispersant polymer is from 10-50% by mass relative to a total amount of the cyan pigment, and
wherein the ratio is 0.57 or less.

3. The active-energy-ray-curable composition according to claim 1, wherein a 50% cumulative volume particle diameter of pigment particles in the active-energy-ray-curable composition is 100 nm or more but 160 nm or less.

4. The active-energy-ray-curable composition according to claim 1, wherein a coloring density of a cured material having an average thickness of 10 μm is 2.00 or more, where the cured material is obtained through curing by irradiating the active-energy-ray-curable composition with active energy rays having an illuminance of 1 W/cm$^2$ and an irradiation dose of 500 mJ/cm$^2$ on a base.

5. The active-energy-ray-curable composition according to claim 1,
wherein change of viscosity of the active-energy-ray-curable composition as determined by Formula (2) below is 15% or less, Change of viscosity (%)=|V−$V_0$|/$V_0$×100   Formula (2), wherein the Formula (2), $V_0$ is a viscosity at 25° C. before storage, and V is a viscosity at 25° C. after storage at 70° C. for 14 days.

6. The active-energy-ray-curable composition according to claim 1, wherein the dispersant polymer is an amino group-containing dispersant polymer, and
wherein an amine value of the amino group-containing dispersant polymer is 10 mg KOH/g or more but 30 mg KOH/g or less.

7. The active-energy-ray-curable composition according to claim 5, wherein the change of viscosity is 10% or less.

8. The active-energy-ray-curable composition according to claim 5, wherein the change of viscosity is 5% or less.

9. An active-energy-ray-curable ink comprising
the active-energy-ray-curable composition according to claim 1.

10. The active-energy-ray-curable ink according to claim 9,
wherein the active-energy-ray-curable ink is used for an inkjet.

11. A composition stored container comprising:
a container; and
the active-enemy-ray-curable composition according to claim 1 in the container.

12. An apparatus for forming a two-dimensional or three-dimensional image, the apparatus comprising:
a storing part containing an active-energy-ray-curable composition; and
an irradiator configured to irradiate the active-energy-ray-curable composition with active energy rays,
wherein the active-energy-ray-curable composition comprises:
a cyan pigment in particle form;
a dispersant polymer; and
a polymerizable compound,
wherein the cyan pigment comprises C.I. pigment blue 15:4,
wherein a ratio of absorbance of the composition at a wavelength of 385 nm to absorbance of the composition at a wavelength of 620 nm ($A_{385}/A_{620}$) is 0.65 or less, and
wherein a distribution width of particle size distribution of pigment particles in the active-energy-ray-curable composition is 60 nm or less as determined by Formula (1):

Distribution width of particle size distribution=(84% cumulative volume particle diameter−16% cumulative volume particle diameter)/2  Formula (1).

13. The apparatus for forming the two-dimensional or three-dimensional image according to claim 12, further comprising an ejecting device configured to eject the active-energy-ray-curable composition by an inkjet recording method.

14. A method for forming a two-dimensional or three-dimensional image, the method comprising
irradiating an active-energy-ray-curable composition with active energy rays,
wherein the active-energy-ray-curable composition comprises:
a cyan pigment in particle form;
a dispersant polymer; and
a polymerizable compound,
wherein the cyan pigment comprises C.I. pigment blue 15:4,
wherein a ratio of absorbance of the composition at a wavelength of 385 nm to absorbance of the composition at a wavelength of 620 nm ($A_{385}/A_{620}$) is 0.65 or less, and
wherein a distribution width of particle size distribution of pigment particles in the active-energy-ray-curable composition is 60 nm or less as determined by Formula (1):

Distribution width of particle size distribution=(84% cumulative volume particle diameter−16% cumulative volume particle diameter)/2  Formula (1).

15. The method for forming the two-dimensional or three-dimensional image according to claim 14, further comprising
ejecting the active-energy-ray-curable composition by an inkjet recording method.

16. The method for forming the two-dimensional or three-dimensional image according to claim 14,
wherein the active energy rays comprise light of a light-emitting diode.

17. A two-dimensional or three-dimensional image, which is obtained by irradiating the active-energy-ray-curable composition according to claim 1 with active energy rays.

18. A structure comprising:
a base; and
the two-dimensional or three-dimensional image according to claim 17 on the base.

19. A processed product, which is obtained by drawing the two-dimensional or three-dimensional image according to claim 17.

* * * * *